United States Statutory Invention Registration [19]

[11] Reg. Number: H43

Michaels [45] Published: Apr. 1, 1986

[54] MAGNETIC LATCH CLOSURE CONTROL

[75] Inventor: Thomas B. Michaels, Pittsford, N.Y.

[73] Assignee: Xerox Corporation, Stamford, Conn.

[21] Appl. No.: 677,622

[22] Filed: Dec. 3, 1984

[51] Int. Cl.[4] ..... G03B 27/62; H01H 9/00

[52] U.S. Cl. ..... 355/75; 355/76; 335/205; 335/207

[58] Field of Search ..... 355/75, 76, 128, 130, 355/131, 106, 14 R; 335/205, 207; 200/318, 323, 325, 61.79–61.82, 61.62, DIG. 34; 220/230

[56] References Cited

U.S. PATENT DOCUMENTS

| | | | |
|---|---|---|---|
| 3,155,792 | 11/1964 | Werts | 200/87 |
| 3,418,610 | 12/1968 | Hammond | 335/205 |
| 3,512,885 | 5/1970 | Osborne et al. | 355/14 CU |
| 3,533,029 | 10/1970 | Steinbach et al. | 335/206 |
| 3,796,850 | 3/1974 | Moreland, II et al. | 219/10.49 |
| 3,888,582 | 6/1975 | Griswold | 355/69 |
| 4,186,362 | 1/1980 | Kondo et al. | 335/205 |
| 4,190,359 | 2/1980 | Murayama et al. | 355/75 |

OTHER PUBLICATIONS

Xerox Disclosure Journal, "Latch for Document Handler" by Paul V. Sadwick, vol. 8, No. 3, May/Jun. 1983, pp. 271–272.

*Primary Examiner*—S. C. Buczinski
*Assistant Examiner*—Linda J. Wallace

[57] ABSTRACT

In a copier with a copying platen, and platen cover unit pivotal thereover, which may comprise a document feeder, the platen cover unit having connecting pivotal lifting means, and a magnetic latch for magnetically latching the platen cover unit in a closed position closely overlying the copier platen with a magnetic flux field between the platen cover unit and the copier generated by at least one magnet on one completing a magnetic circuit through at least one magnetic flux conductive member on the other when the magnetic latch is closed, the magnetic latching of the platen cover unit in the closed position providing for document retention and illumination thereunder and magnetic resistance to opening of the platen cover unit by the lifting means, and with a switch for indicating closure of the platen cover unit, the improvement wherein the switch comprises a magnetic switch magnetically coupled to the magnetic latch, the magnetic switch being magnetically actuated in response to the change in magnetic flux field of the magnetic latch corresponding to the completion of the magnetic circuit through the magnetic flux conductive member, the magnetic switch providing a control signal to the copier in direct response to, and indicative of, the completed, positive, magnetic latching of the platen cover unit in the closed position.

1 Claim, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAGNETIC LATCH CLOSURE CONTROL

The invention relates to an improved magnetic latch for a copier platen cover unit, particularly one comprising an original document feeder, providing a control signal in response to positive magnetic latching closure of the platen cover unit over the copier platen.

Positive assurance of a complete and locked closure of a platen cover unit over the platen is important for copiers for several reasons. If the copier uses flash, e.g. Xenon flash lamp, document illumination for the copying exposure, it is particularly desirable to prevent exposure of the operator to these light flashes by insuring full covering of the platen with the platen cover, regardless of the type of cover. Further, if the platen cover is even slightly ajar, an original document sheet with curls or wrinkles may not be sufficiently flattened against the platen by the platen cover for uniform or fully in-focus copying. This slight spacing may not be noticed by the operator visually. Heavy spring-loaded platen cover units have a tendency to "bounce"up slightly after rapid closure and not properly latch. Strong spring counterbalances are common in RDHs (recirculating document handlers) because their weight makes them difficult to pivot open otherwise. Such opening (lifting) of an RDH platen cover unit is required for alternative manual document placement on the platen and for document jam clearance. Where the platen cover is an integral part of an original document feeder, particularly a recirculating document feeder, as is now common, there are additional dangers of document misfeeds or damage from such a cover unit that is not positively latched down in its proper operating position over the platen. Further, starting of the document feeder may even cause a slightly unlatched spring-loaded platen cover unit to fly open.

It is known in certain platen cover units to provide a conventional mechanical switch which is mechanically activated in response to closure of the platen cover unit. Such interlock switches are known for enablement or disablement of flash illumination of the platen and/or operation of an original document feeder by their electrical connection to the copier controller. However, such mechanical switches activate in response to the proximate closure of the platen cover unit to adjacent its closed position and not to actual full closure or to actual latching. Mechanical sagging, warping or other misalignment of the platen cover unit aggravates this mechanical switch inaccuracy problem. Since platen cover units are typically cantilevered, i.e. suspended only from rear end hinge/counterbalance (lifting) spring units except when latched down at their front edge, such misalignments are not unusual, especially for the heavy RDH units now in use. Thus, mechanical platen cover unit closure switches have been found to be not sufficiently accurate or reliable. Where they activate in response to partial rather than full closure they may actually be dangerously misleading to the operator, as indicating the cover unit is latched down when it is not.

These tendencies and problems with accidental nonlatching are particularly so for magnetic latches, which do not have a hook or other positive mechanical retention or lock for the platen cover unit in the closed position. Yet magnetic latches are preferred for document handlers and other platen covers. Unlike mechanical latches, magnetic latches cannot be damaged by being "forced", do not require special buttons or levers which may be hard for a casual operator to find or use, and do not have protruding hooks which can damage documents or the operator. However there is a particular difficulty with magnetic latches in insuring positive latching, especially before starting the operation of a document handler.

The system of this invention provides such positive latching assurance for a magnetic platen cover latch. The system disclosed herein is simple, inexpensive, and is applicable to almost any type of platen cover unit for document holding, document feeding, and/or a flash protector cover. A control signal directly indicative of actual (positive) latching of the platen cover unit magnetic latch is provided. This signal may be variously used for document protection and/or operator safety. As disclosed, a magnetic switch detects the actual change in magnetic flux which occurs when the latch magnet(s) make(s) the magnetic latch connection for magnetically locking the platen cover unit in its closed position. This principle is applicable to various magnetic latches.

By way of background art, one example of a magnetically latched platen cover unit (with document ejection) is disclosed in U.S. Pat. No. 3,888,582 issued June 10, 1975 to A. W. Griswold. Another, on which the embodiment disclosed hereinbelow is based, is disclosed in Xerox Disclosure Journal Vol. 8No. 3, pp. 271–272 published May/June 1983. U.S. Pat. No. 3,512,885 issued May 19, 1970 to Osborne et al discloses in FIG. 36 and Cols. 35–38 a magnetic switch platen cover interlock circuit for billing purposes. Note Col. 38, lines 64–73. A very similar disclosure is in U.S. Pat. No. 3,301,126 by the same inventors.

Various magnetic reed switches and magnetic actuators therefore are known per se. By way of examples, as understood, U.S. Pat. No. 3,155,792 to Werts discloses a magnetic reed switch device for controlling the path of magnetic flux from a magnet. Referring to FIGS. 1–3 of said werts patent that switching device comprises a magnetic reed switch 11, a permanent magnet 15 and a pair of movable shutter magnetic plates 17 and 18 positioned between the switch and magnet. More particularly, the two magnetic plates provide a low reluctance path for the flux from magnet 15 thereby apparently forming a shutter magnetic shunt 16. U.S. Pat. No. 3,418,610 to Hammond disloses a magnetic reed switch in which the position of a permanent magnet relative to the reed switch is varied to control switch contacts. In the embodiment of FIG. 4 of said Hammond patent, the lever supporting member 43 can be vertically adjusted to vary the gap between magnet 54 and a reed switch (not shown) to control the switch. U.S. Pat. No. 3,533,029 to Steinback et al shows a reed switch which is actuated through mobile permanent magnets. As shown in FIG. 2 of said Steinback patent, reed contacts 4 are controlled by magnets 1 which are fastened to shafts 5. These magnets are moved in the direction of arrow 7 against spring 6. U.S. Pat. No. 3,796,850 to Moreland et al discloses a reed switch arrangement in an induction heating cooking unit. More particularly, in FIG. 2 of Moreland, a magnetic material 22 is placed in proximity to reed switch 10. This magnetic material shunts a portion of the magnetic field so that the induced magnetism causes leaves 12 and 14 of the switch to be maintained in a closed position.

Various platen cover unit springs are known in the art. Some examples are disclosed in references listed herein.

Some examples of various other patents generally teaching known copier document handlers and copiers and control systems therefor, including document and paper path switches and counters, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, 4,335,949 and 4,428,666. Conventional simple software instructions in a copier's conventional microprocessor logic circuitry and software of document handler and copier control functions and logic, as taught by the above and other patents and various commercial copiers, are well known and preferred. However, it will be appreciated that the functions and controls described herein may be alternatively conventionally incorporated into a copier utilizing any other suitable or known simple software or hard wired logic systems, switch controllers, etc.. Suitable software for functions illustrated or described herein may vary depending on the particular microprocessor or microcomputer system utilized, of course, but will be already available to or readily programmable by those skilled in the art without experimentation from the descriptions and references provided herein.

As shown in the above-cited art the control of exemplary document and copy sheet handling systems in copiers may be accomplished by conventionally actuating them by signals from the copier controller directly or indirectly in response to simple programmed commands and from selected actuation or non-actuation of conventional copier switch inputs by the copier operator, such as switches selecting the number of copies to be made in that run, selecting simplex or duplex copying, selecting whether the documents are simplex or duplex, selecting a copy sheet supply tray, etc.. The resultant controller signals may conventionally actuate various conventional electrical solenoid or cam controlled sheet deflector fingers, motors or clutches in the copier in the selected steps or sequences as programmed. Conventional sheet path sensors, switches and bail bars, connected to the controller, may be utilized for sensing and timing the positions of documents and copy sheets, as is well known in the art, and taught in the above and other patents and products. Copying systems utilize such conventional microprocessor control circuitry with such connecting switches and sensors for counting and comparing the numbers of document and copy sheets as they are fed and circulated, keeping track of their positions, counting the number of completed document set circulations and completed copies, etc. and thereby controlling the operation of the document and copy sheet feeders and inverters, etc..

All references cited herein, and their references, are incorporated by reference herein for appropriate teachings of additional or alternative details, features, and/or technical background.

The present invention desirably overcomes or reduces various of the problems or limitations discussed above and/or in the cited references.

A preferred specific feature disclosed in this specification is to provide an improvement in a copier with a copying platen, and platen cover unit pivotal thereover, which may comprise a document feeder, said platen cover unit having connecting pivotal lifting means and a magnetic latch for magnetically latching said platen cover unit in a closed position closely overlying said copier platen with a magnetic flux field between said platen cover unit and said copier, generated by at least one magnet on one completing a magnetic circuit through at least one magnetic flux conductive member on the other when said magnetic latch is closed, said magnetic latching of said platen cover unit in said closed position providing for document retention and illumination thereunder and magnetic resistance to opening of said platen cover unit by said lifting means, and with a switch for indicating closure of said platen cover unit, the improvement being wherein said switch comprises magnetic switch means magnetically coupled to said magnetic latch means, said magnetic switch means being magnetically actuated in response to the change in magnetic flux field of said magnetic latch corresponding to said completion of said magnetic circuit through said magnetic flux conductive member, said magnetic switch means providing a control signal to said copler in direct response to, and indicative of, the completed, positive, magnetic latching of said platen cover unit in said closed position.

Additional specific features disclosed herein are such as wherein said magnet of said magnetic latch has a first open magnetic pole pair spaced from said magnetic flux conductive member and a second and parallel open magnetic pole pair positioned to be magnetically connected by said magnetic flux conductive member when said magnetic latch is closed, and said magnetic switch means comprises a magnetic reed switch mounted in the magnetic flux field of said first pole pair for actuation by the change in the magnetic flux level therein when said second magnetic pole pair is sufficiently connected by said magnetic flux conductive member to provide positive magnetic latching of said platen cover units; and wherein said magnetic flux conductive member is a metal striker plate on the upper surface of said copier and said magnet and said reed switch are integrally mounted in said platen cover unit.

Various of the above-mentioned and further features and advantages will be apparent from, but not limited to, the following specific example of one application of the invention. The following description of this exemplary embodiment includes drawing figures (approximately to scale) wherein.

Figure 1:
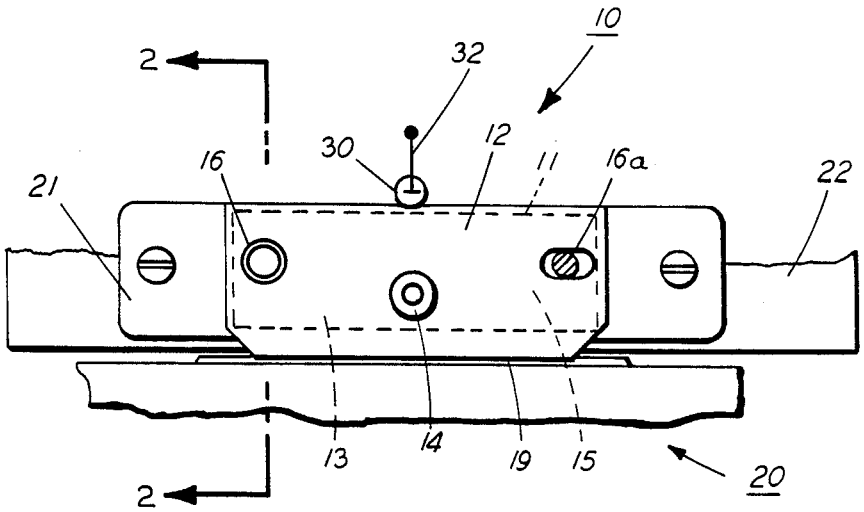
FIG. 1 is a front view of one example of an integral platen cover unit magnetic latch and magnetic switch latching detector and control signal generator in accordance with the present invention.
Figure 2:
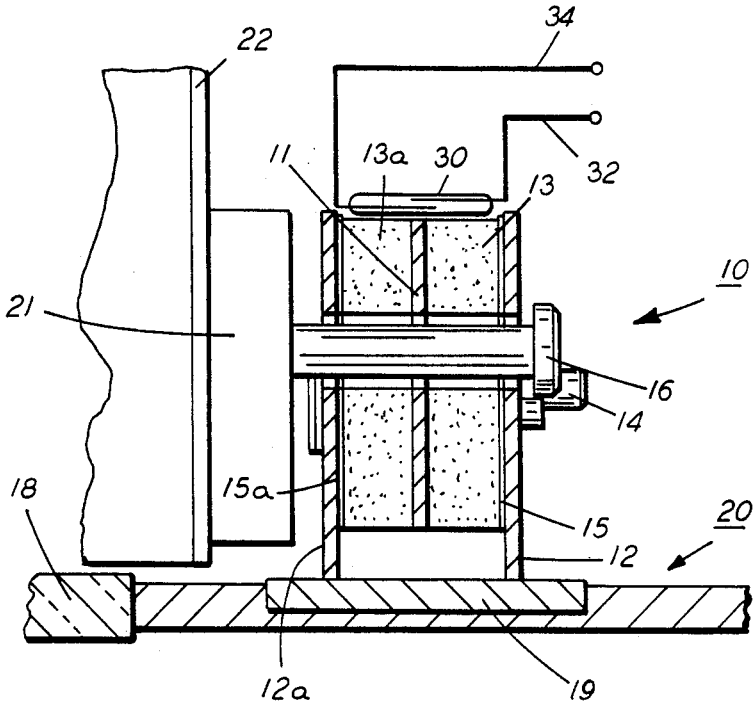
FIG. 2 is a cross-sectional side view of the apparatus of FIG. 1, viewed along the cross-sectional viewing line 2—2 of FIG. 1.
Figure 3:
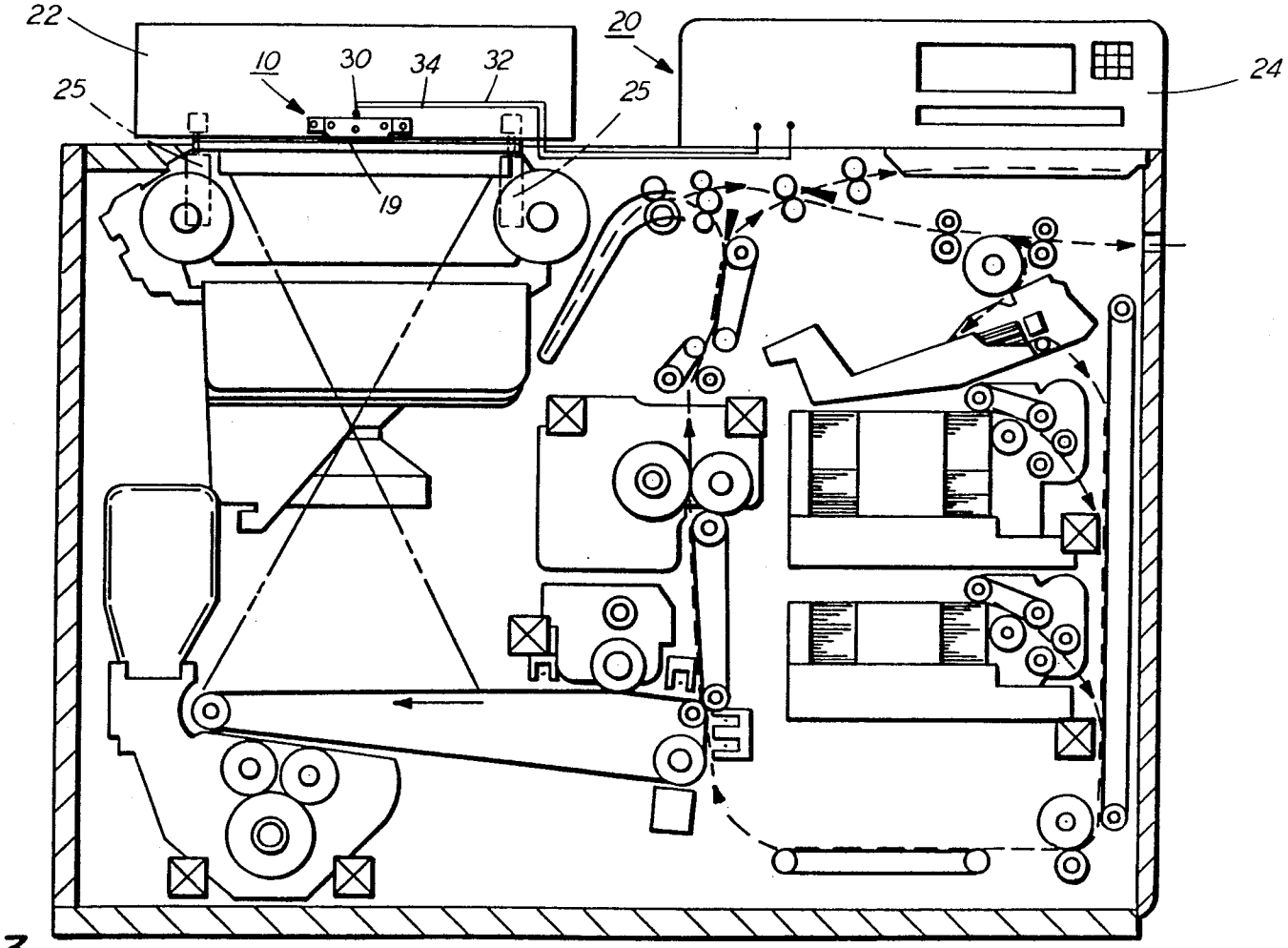
FIG. 3 is a front view of an exemplary modern commercial copier with an exemplary commercial recirculating document handler type of platen cover unit incorporating the system of FIGS. 1 and 2.

The disclosed magnetic latch unit 10 with its integral control signal generator of FIGS. 1 and 2 is applicable to almost any magnetically latched platen cover unit and copier. The exemplary copier 20 with RDH 22 and controller 24 of FIG. 3 is a simplified depiction of the Xerox Corporation "1075" copier, RDH version, further described, for example, in U.S. Pat. Nos. 4,278,344 issued July 14, 1981 to R. B. Sahay and 4,428,667 issued Jan. 31, 1984 to R. L. Phelps et al. Conventional gas spring rear-mounted counterbalances 25 for pivotally lifting the RDH 22 away from the platen 18 when it is unlatched are illustrated in phantom in FIG. 3.

The system disclosed here provides, directly from the latch unit 10, a control signal directly indicative of actual (positive) magnetic latching of the platen cover unit 22 in its fully closed position directly overlying the copier platen 18. This is important both for document protection and operator safety. As further described hereinbelow the principle is applicable to various magnetic latches.

A unique and unusual application of a magnetic switch is used to detect complete closing of the document handler over the platen cover. A commercially available magnetic reed switch 30 detects the change in magnetic flux which occurs when the platen cover latch magnet poles **12, 12*a* make appropriately sufficient magnetic connection to the latch striker plate 19. The completing of magnetic latching itself shunts sufficient magnetic flux to open the reed switch to signal precise closure. A positive latching control signal is thereby provided over conventional connecting wires or lines 32, 34 to the copier 20 controller 24** to allow illumination and document feeding to begin or proceed.

As generally described in the above-cited U.S. Pat. No. 3,888,582 to A. W. Griswold, the mounting of the integral platen cover unit 22 pivotally to the copying apparatus 20 may be a conventional hinge mounting along the rear edge of the platen cover unit 22. There is additionally conventionally provided a mechanical or gas spring 25 arrangement for the automatic pivotal lifting or counterbalancing of the platen cover away from the platen 18 whenever the platen cover is unlatched. Any conventional lifting spring arrangement therefor may be provided, such as that illustrated in FIG. 3, or as described for example in U.S. Pat. Nos. 3,615,134 or 3,642,371 or XDJ Vol. 7, No. 2, pp. 109–110, published March/April 1982. This platen cover lifting spring 25 preferably has sufficient force to lift and hold the platen cover substantially away from the platen 18 automatically whenever the platen cover is unlatched from the copying position overlying the platen 18. In this raised position, documents may be readily manually placed on the platen without any manual handling of the platen.

The above-noted U.S. Pat. No. 3,642,371, and other platen covers are known wherein a hook or other mechanical latch is provided to hold down an upwardly sprung platen cover, where the platen cover may be unlatched either manually or automatically electrically. However, such mechanical platen cover holddowns have disadvantages in copiers. The operator has to know where the latch release handle is located and then manually operate it each time it is desired to let the platen lift. That is, such a spring-loaded platen cover cannot be lifted manually from the platen unless the operator finds and operates the appropriate latch release button or lever. An attempt to force the platen cover open with these latch devices could cause damage to the latch or to the platen cover.

In contrast, as pointed out in said U.S. Pat. No. 3,888,582, a simple magnetic latch can provide sufficient latching force to hold down even a self-lifting platen cover against the lifting force of the platen cover lifting spring, and also against the force of the document feeder operation. Yet such a magnetic latch can be manually unlatched merely by slight manual lifting of the platen cover at any time. Thus, no operator instruction is required. It is effectively jam-proof since there is no mechanical parts interlock. Since there is no separate lever or button to be operated, there is no possibility of damage to the cover by manually lifting it, since that is all that is required to unlatch the cover. An automatic electric unlatching system as in said U.S. Pat. No. 3,888,582 may be optionally provided for unlatching the magnetic latch. However, the magnetic latch does not need any electrical power to be manually opened. Therefore, a document cannot be trapped by machine shut downs or power interruptions. Further, there are no hooks or other projections which an operator or document could accidentally encounter.

Referring now particularly to FIGS. 1 and 2, the exemplary magnetic latch 10 per se illustrated here is a modification of the latch disclosed in the above-cited Publication, the Xerox Disclosure Journal, Vol. 8, No. 3, May/June 1983, pp. 271–2. It comprises a magnet constructed with conventional permanent magnet material mounted to extend along the outer-most (front) edge of the platen cover unit 22, and extending slightly below the platen cover lower surface. The magnet overlays, and upon closure contacts, a strip 19 of magnetically attractable material fastened to the copying apparatus just off the front edge of the platen called the striker plate. When the platen cover unit is closed, the magnet magnetically latches to the metal strip 19. Since the magnetic latch 10 is located on the front edge of the platen cover unit, furthest from the hinge side, the magnetic latch has the maximum leverage possible for acting against, and overcoming, the cover lifting springs 25. However, once the cover unit 22 is even slightly lifted (or bounces upon closure) so that the magnet separates from the metal strip 19, even slightly, then the platen cover lifting springs 25 provide the predominant force, so that the platen cover unit 22 lifts upwardly from that closed, latched, position automatically.

It will be appreciated that the number, type and relative positions of the magnetic latch components may be varied substantially from those exemplarily described here. However, there will now be provided further details of the specific magnetic latch example disclosed here. This magnetic latch unit 10 is the sole means for holding down the platen cover unit 22 (here a recirculating document handler) over the platen 18 of a copier against the platen cover's lift springs. The latch magnet unit 10 is designed to latch (mate with) a steel striker plate 19 on the surface of the copier 20. The component parts in this example include a steel center plate 11 and two identical steel end plates **12, 12*a*, both requiring different hole sizes and shapes from the center plate 11, and two magnets 13, 13*a* sandwiched therebetween. A strong hold-down force, with less magnetic material, can be provided by providing pivotable, self-aligning, and somewhat independent movement of each of the two outer shoes or end plates 12 and 12*a* of the latch 10 about a central pivot pin 14. The center plate 11 also provides rigidity and support for the two layers 13 and 13*a* of magnetic material, which preferably are a rubber-like material bonded to plate 11. Because the two outer shoes 12, 12*a* are independently movable relative to one another they can both make a completely flush contact with the mating magnetic flux conducting latch striker plate surface 19 to complete the magnetic circuit, regardless of minor variations in the angle of that mating surface or variations in the alignment of the platen cover. This pivotable movement is assisted by thin Mylar low-friction spacers 15 and 15*a* between the magnetic material 13 and the outer shoes or plates 12 and 12*a***.

The center plate 11 has two side slots which are limited in vertical height compared to the two larger holes at each side of the end plates 12, 12*a*. The center plate 11 receives the lifting force of the platen cover 22 counterbalance springs 25 (tending to pull the latch 10 open) from two pins 16 and 16*a* extending through the assembly into the latch mounting bracket 21 on the platen cover. That lifting force is transmitted equally because of the center pin 14 to the two end plates 12, 12*a*, which resist it when they are engaging the latch plate 19.

When the document handler platen cover unit 22 is unlatched for any reason, one or both of the lower edges of plates 12 and 12*a* defining one pole pair of the magnetic latch will be at least slightly separated from the magnetic flux conductive striker plate 19. The striker plate 19 only provides a sufficiently connecting, low reluctance, high flux magnetic path between the lower ends of the opposing poles 12 and 12*a* when the cover unit is fully magnetically latched by positive line contact of the lower edges of both plates 12 and 12*a* with the striker plate 19, as in FIGS. 1 and 2. The change in flux is directly proportional to the magnetic holding force of the latch. When such completed magnetic latching occurs it has been found by the inventor that there is a corresponding but opposite change in the magnetic flux field at the other side of the same magnet, i.e. between the upper edges or pole of the pole plates 12 and 12*a*, which defines another, but magnetically parallel, pole pair. It has been found that by appropriately mounting a conventional magnetic reed switch 30 in this upper pole pair field, i.e. between the upper edges of plates 12, and 12*a*, that any unlatching of the magnetic latch causes sufficient flux to pass through the switch 30 to keep it pulled in (contacts closed). Contrarily, only when both poles of the magnetic latch assembly sufficiently completely contact the striker plate 19 (a completed latching) does the reed switch 30 open, due to the corresponding drop in the magnetic flux level therethrough. That is, the shunting of the magnetic flux through the now lower reluctance path of the now pole-bridging striker plate 19 reduces the flux field through the other, alternate, parallel pole flux path in which the magnetic switch 30 is mounted, allowing this switch's electrical contacts to open, and thus providing an electrical control signal on leads 32, 34 directly indicative of positive mechanical latching, and only as long as such latching continues.

Adjustment of the type (model), and/or size and/or position of the reed switch 30 and/or the spacing between the ends of the magnetic pole pairs 12, 12*a* can provide changes in the sensitivity or level of magnetic latching or unlatching at which the magnetic switch 30 operates.

The magnetic reed switch 30 may be mounted in any position in which there is a sufficiently high flux level when the latch is open. This may be determined, for example, by a flux meter or by experimental movement of the reed switch. As an alternative embodiment, it has been found that the reed switch may be effectively mounted on the back of the inside plate 12*a* adjacent a lower corner thereof. It has also been found that this is satisfactory with a simpler latch unit not having a central plate 11 and having only a single magnet instead of two (13, 13*a*) and having only a single central pivotal mounting bolt.

While the embodiments disclosed herein are preferred, it will be appreciated that they are merely examples, and that various alternatives, modifications, variations or improvements may be made by those skilled in the art from this teaching, which are intended to be encompassed by the following or subsequent claims:

What is claimed is:

1. In a copier with a copying platen, and a heavy, rigid platen cover unit pivotal thereover comprising a document feeder, said platen cover unit having connecting pivotal lifting counterbalance means, and a magnetic latch for magnetically latching said platen cover unit in a closed position closely overlying said copier platen with a magnetic flux field between said platen cover unit and said copier generated by at least one permanent magnet on one completing a magnetic circuit through at least one magnetic flux conductive member on the other when said magnetic latch is closed, said magnetic latching of said platen cover unit in said closed position providing for document retention and illumination thereunder and magnetic resistance to opening of said platen cover unit by said lifting counterbalance means, and with a switch for indicating closure of said platen cover unit, the improvement wherein said switch comprises magnetic switch means magnetically coupled to said magnetic latch means, said magnetic switch means being magnetically actuated in response to the change in magnetic flux field of said magnetic latch corresponding to said completion of said magnetic circuit through said magnetic flux conductive member corresponding to positive magnetic latching of said platen cover unit, wherein said magnet of said magnetic latch has at least one open magnetic pole pair spaced from said magnetic flux conductive member, and said magnetic switch means comprises a magnetic reed switch mounted in the magnetic flux field of said pole pair for actuation by the change in the magnetic flux level therein when said magnet is sufficiently magnetically connected to said magnetic flux conductive member to provide positive magnetic latching of said platen cover unit thereto, and wherein said magnetic flux conductive member is a metal striker plate on the upper surface of said copier and said magnet and said reed switch are integrally mounted in said platen cover unit, said magnetic switch means providing a control signal to said copier in direct response to, and indicative of, the completed, positive, magnetic latching of said platen cover unit in said closed position.

* * * * *